UNITED STATES PATENT OFFICE.

GEORGE KELLY, OF HINSDALE, ILLINOIS.

GLUE.

No. 870,367.        Specification of Letters Patent.        Patented Nov. 5, 1907.

Application filed April 18, 1906. Serial No. 312,442.

*To all whom it may concern:*

Be it known that I, GEORGE KELLY, a citizen of the United States, residing at Hinsdale, in the county of Dupage and State of Illinois, have invented a new and useful Glue, of which the following is a specification.

This invention relates to glue or cementitious binding means, and the principal object is to provide a composition of great effectiveness and lasting qualities that may be cheaply manufactured and placed on the market either in solid or liquid form, the material, moreover, eliminating the necessity of animal matter that is liable to decompose.

In carrying out the invention, liquid glass, preferably silicate of sodium in liquid form, white lead, sulfur and rubber are commingled. Ninety five parts of silicate of sodium are employed, with about five parts of flower of sulfur, ten to fifteen parts of rubber and five parts of white lead. These ingredients are thoroughly intermixed in any well known manner, so that they form an even and perfect mixture having a thick syrup-like consistency.

If the composition is to be put up in liquid form, the said mixture is placed in suitable air tight bottles, cans, and the like, but if it is to be made solid, the said liquid, as prepared, is poured on to a smooth surface, preferably in a thin sheet, and the moisture is allowed to evaporate therefrom. To hasten the evaporation and secure a high grade glue, the composition may be run from one pan to another, and kept moving as much as possible in order to bring the moisture to the surface. Afterwards it may be broken into lumps or ground into powder.

Experience has demonstrated that the mixture or composition forms an excellent binding material for various purposes, as for instance, in securing wood or pieces of earthen ware together, as well as iron and fibrous material. It is particularly advantageous for use as a binding agent when fibrous material is made into sheets, as it may be mixed with the material, and the whole rolled into boards and the like. The cemented sheets, after having been rolled, can be submitted to high pressure and heat, so that they will be formed into vulcanized fiber board. In some compositions the white lead and rubber may be eliminated, especially where the liquid or composition is employed for cementing purposes in certain kinds of earthen ware and wood. The sulfur is important, as it imparts to the compound, moisture-resisting properties. The white lead gives slow drying properties to the composition and these properties are not entirely necessary in all cases. For general use, however, the four ingredients mentioned and the proportions stated, have been found to give excellent results, though the proportions may be varied to a considerable degree without departing from the spirit or scope of the invention.

Having thus fully described my invention, what I claim as new, and desire to secure by Letters Patent, is:

1. A glue or binder, comprising liquid glass and sulfur, the proportion of the liquid glass being greater than the proportion of sulfur.
2. A glue or binder, comprising liquid glass, sulfur and rubber.
3. A glue or binder, comprising liquid glass, vegetable gum, sulfur and white lead.
4. A glue or binder, comprising liquid glass, sulfur, rubber and white lead.
5. A glue or binder, comprising liquid silicate of sodium, sulfur, rubber and white lead.
6. A glue or binder, consisting of a composition of ninety-five parts of liquid glass and five parts of sulfur.

In testimony, that I claim the foregoing as my own, I have hereto affixed my signature in the presence of two witnesses.

GEORGE KELLY.

Witnesses:
     JOHN H. SIGGERS,
     E. G. SIGGERS.